US007501036B2

(12) United States Patent
Ballestrazzi et al.

(10) Patent No.: US 7,501,036 B2
(45) Date of Patent: Mar. 10, 2009

(54) MANIPULATION AND PRINTING DEVICE AND METHOD FOR LABELS FED FROM LABEL SHEETS

(75) Inventors: Aris Ballestrazzi, Savignano sul Panaro (IT); Lamberto Tassi, Savignano sul Panaro (IT)

(73) Assignee: Sitma S.p.A., Spilamberto-Modena (IT)

( * ) Notice: Subject to any disclaimer, the term of this patent is extended or adjusted under 35 U.S.C. 154(b) by 505 days.

(21) Appl. No.: 11/280,519

(22) Filed: Nov. 16, 2005

(65) Prior Publication Data

US 2006/0130963 A1 Jun. 22, 2006

(30) Foreign Application Priority Data

Nov. 30, 2004 (IT) .......................... MI2004A2304

(51) Int. Cl.
*B32B 37/16* (2006.01)
*B32B 38/04* (2006.01)

(52) U.S. Cl. ....................... 156/264; 156/250; 156/510; 156/516; 156/517; 156/521; 156/542

(58) Field of Classification Search ................. 156/250, 156/277, 539, 540, 541, 542, 517, 518, 521, 156/351, 354, 355, 382, 264
See application file for complete search history.

(56) References Cited

U.S. PATENT DOCUMENTS 3,641,319 A * 2/1972 McGuire .................... 156/362
3,713,948 A * 1/1973 Kluger ........................ 156/351
3,915,785 A * 10/1975 Muller ........................ 156/351
4,028,167 A * 6/1977 Gerber ........................ 156/384
4,670,081 A * 6/1987 Takahashi et al. ........... 156/384
6,129,814 A * 10/2000 Ballestrazzi et al. ........ 156/556
2003/0192639 A1* 10/2003 Mitchell et al. ............. 156/250
2005/0115680 A1* 6/2005 Thoms et al. ............... 156/354

* cited by examiner

*Primary Examiner*—Mark A Osele
*Assistant Examiner*—Christopher C Caillouet
(74) *Attorney, Agent, or Firm*—James V. Costigan; Hedman & Costigan, P.C.

(57) ABSTRACT

A manipulation and printing device for labels fed from label sheets, in which labels (15) are fed to a cutting group (18) placed above a feed belt (19) of suction type (20) equipped with superficial holes, placed perpendicular to the feed direction of a continuous label sheet (12), and to a labeller (30), in which it is foreseen associated to the first feed belt (19) a second feed belt (24) and a print head (23), placed near a first side end perpendicular to the feed direction of the label sheet (12), the feed belts (19, 24) being facing in one of their sections in order to advance the single printed label from the print head (23) towards the labeller (30). Furthermore, a method is realized in which labels (15) are fed to a cutting group (18) placed above a feed belt (19, 20) placed perpendicular to the feed direction of a continuous label sheet (12), and then to a labeller (30), where the method foresees a feeding of the single labels by means of the first feed belt (19) towards a print head (23) located near a first side end perpendicular to the feed direction of the label sheet (12), to print one single label after another and direct the single printed (14) labels (15) towards the labeller (30).

2 Claims, 5 Drawing Sheets

MANIPULATION AND PRINTING DEVICE AND METHOD FOR LABELS FED FROM LABEL SHEETS

BACKGROUND OF THE INVENTION

The present invention refers to a manipulation and printing device and a method for labels fed from label sheets.

In the field of product labelling, various techniques are used for the feeding of the labels and their positioning on the product, in relation with the user's specific need and the particular nature of the label. Indeed, beyond having to respect the typology and the position of a label on a product, in relation with the particular current postal regulations in a certain Country, the "birth" of the label may be different in relation with the user's need.

Indeed it should be taken into consideration that there are presently known labellers which reveal the single labels one after the other, for example pre-printed on a label sheet, and apply them one after the other on the single product, fed and destined for packaging, or on which label only the address or other specific indication must be placed.

In this particular typology, the operation steps of a known labeller may be summarised in the following manner.

The labels 15, as said, are arranged on a continuous sheet 12, such as a label sheet equipped with opposing side edges 11 with drive holes 13, which is initially whole and folded as an accordion or in a zigzag manner on itself into various faces. On the label sheet 12 there are identified a series of printed portions 14 which will realise the various labels 15.

A wheel feed system with pins (not shown) engaged on the side edges 11 of the label sheet 12, equipped with holes 13, and therefore the label sheet 12 advances on a horizontal plane so that the writing 14 printed on the various label portions 15 are turned downward, as is schematised in FIGS. 1 and 2.

The label sheet 12 is cut and subdivided by longitudinal and transverse knives and reduced into rows 16 of a certain number of labels 15.

The rows 16 of labels 15 are taken up by a holed, suction (not shown) transport belt which accompanies them on a wheel of drawing and deposit (not shown) on the product 17, to which they must be associated.

Then, from the wheel, the labels 15 are individually drawn one after the other and brought into contact with a neck plug (not shown). Subsequently they are released on the product 17 in transit in the plane of the packaging machine or in the plane of application of the label bearing the address.

In such a manner the labels 15 are arranged in position perpendicular to a heading title 10 (FIG. 1), i.e. not conforming to the particular postal regulations which impose the mentioned parallelism between heading title 10 and label with address 15. To overcome this drawback a rotation of 90° may be realised of the label 15 before its deposition on the product 17 (FIG. 2) parallel to the heading title 10.

In any case, until today, it is not possible to have a machine which permits a realisation according to the requirements of the specific label, also individually different from that preceding, directly before the application on the product. Indeed, there is the need of the printing of the label sheet which limits the possibility of sudden variation or impedes a possible label correction, if during the operation the presence is revealed of a printing error therein.

It is therefore easily comprehensible that all this strongly compromises the productive capabilities of the label and address application machine, for example associated with a packaging machine, and imposes additional costs for the elimination of non-conforming products or the shutdown of the entire device, with serious production damages.

A further problem arises when label productions must be had in small series, for which the realisation of pre-printed label sheets would lead to an inadmissible increase in costs, i.e. with continuous substitution of the same with down times and loss of productivity.

Principal object of the present invention is therefore that of providing a solution to the abovementioned technical problems and drawbacks.

A further object is that to possibly realise a labeller which permits a variety of label realisations, in relation to the user's need, without having a shutdown or a particularly complicated device, difficult to use and with the necessity of also costly regulation.

Still a further object of the present invention is to resolve the problem of the small productions with reduced costs.

Still another object of the present invention is to be able to use component equipment of low cost and particularly simple to use.

SUMMARY OF THE INVENTION

These objects according to the present invention are reached by realising a manipulation and printing device and a method for labels fed from label sheets according to that set out in the attached independent claims.

Further characteristics relevant to the present invention are object of the dependent claims.

DETAILED DESCRIPTION OF THE INVENTION

Figure 1:
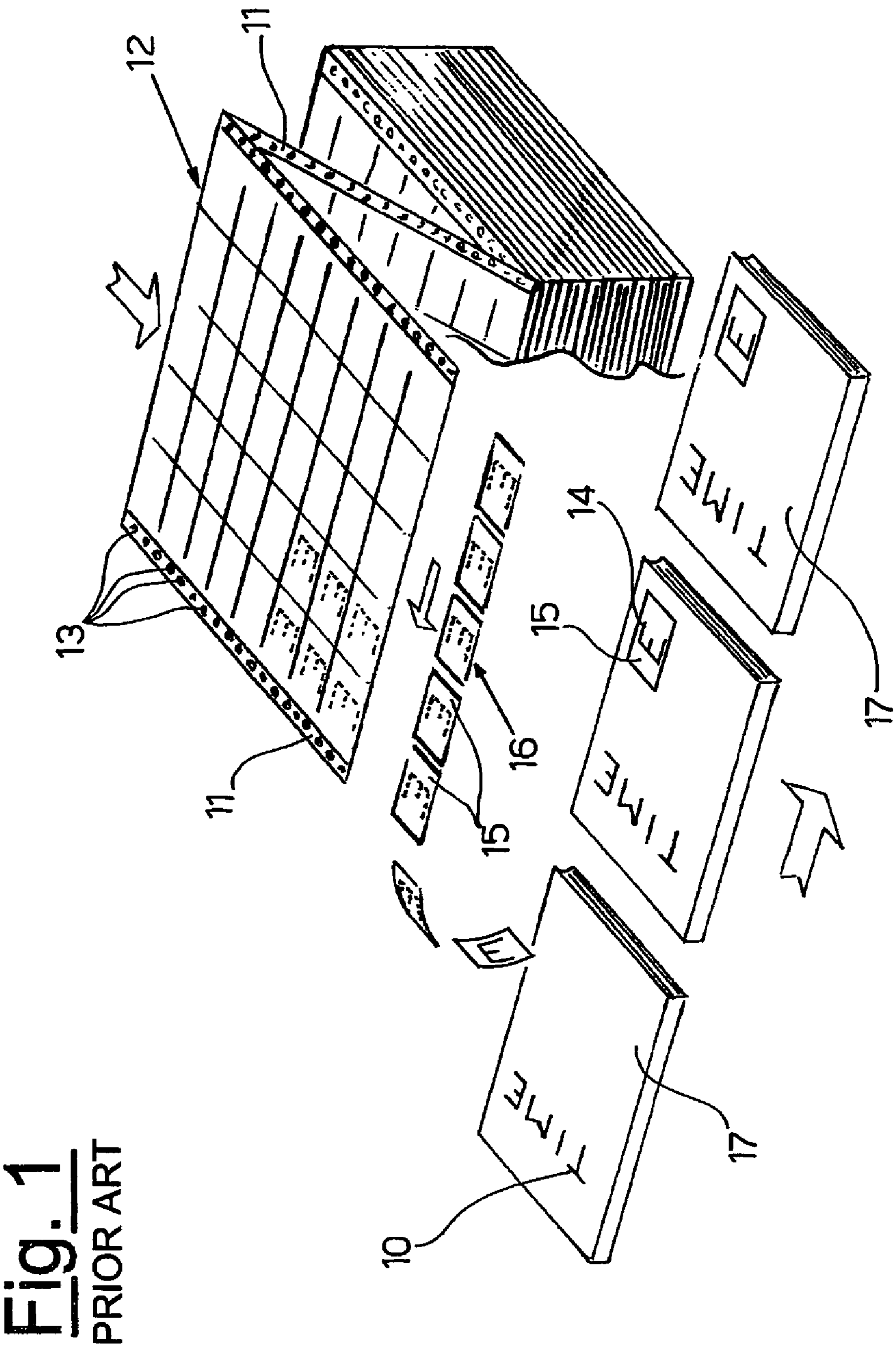
Fig. 1 PRIOR ART
FIG. 1 is a perspective view of a prior art technique for manipulation and printing whereby labels are fed from a label sheet so that the labels are arranged perpendicular to the heading title of the product.
Figure 2:
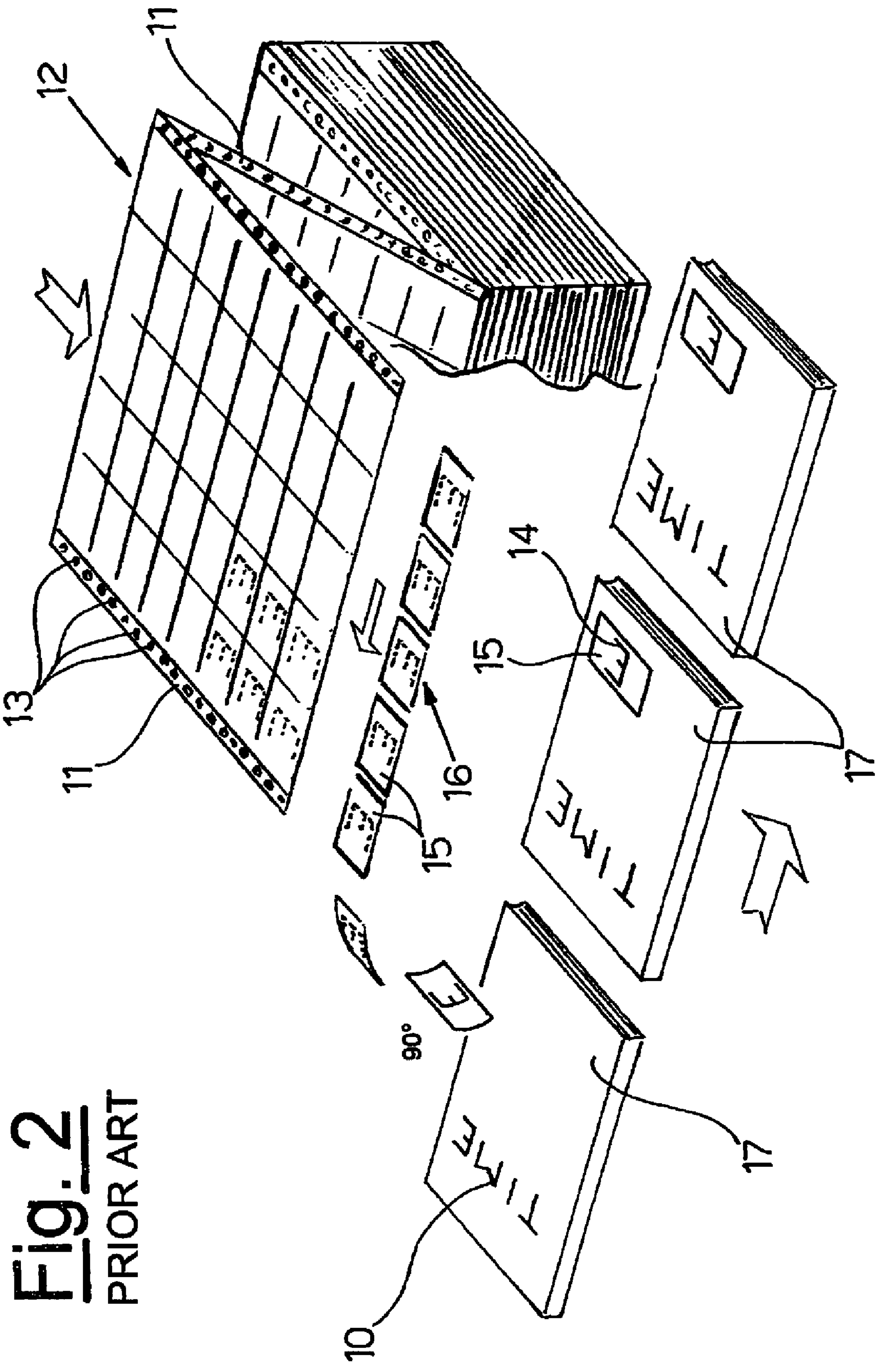
Fig. 2 PRIOR ART
FIG. 2 is a perspective view of a prior art technique for manipulation and printing whereby labels are fed from a label sheet so that the labels are arranged parallel to the heading title of the product.
Figure 3:
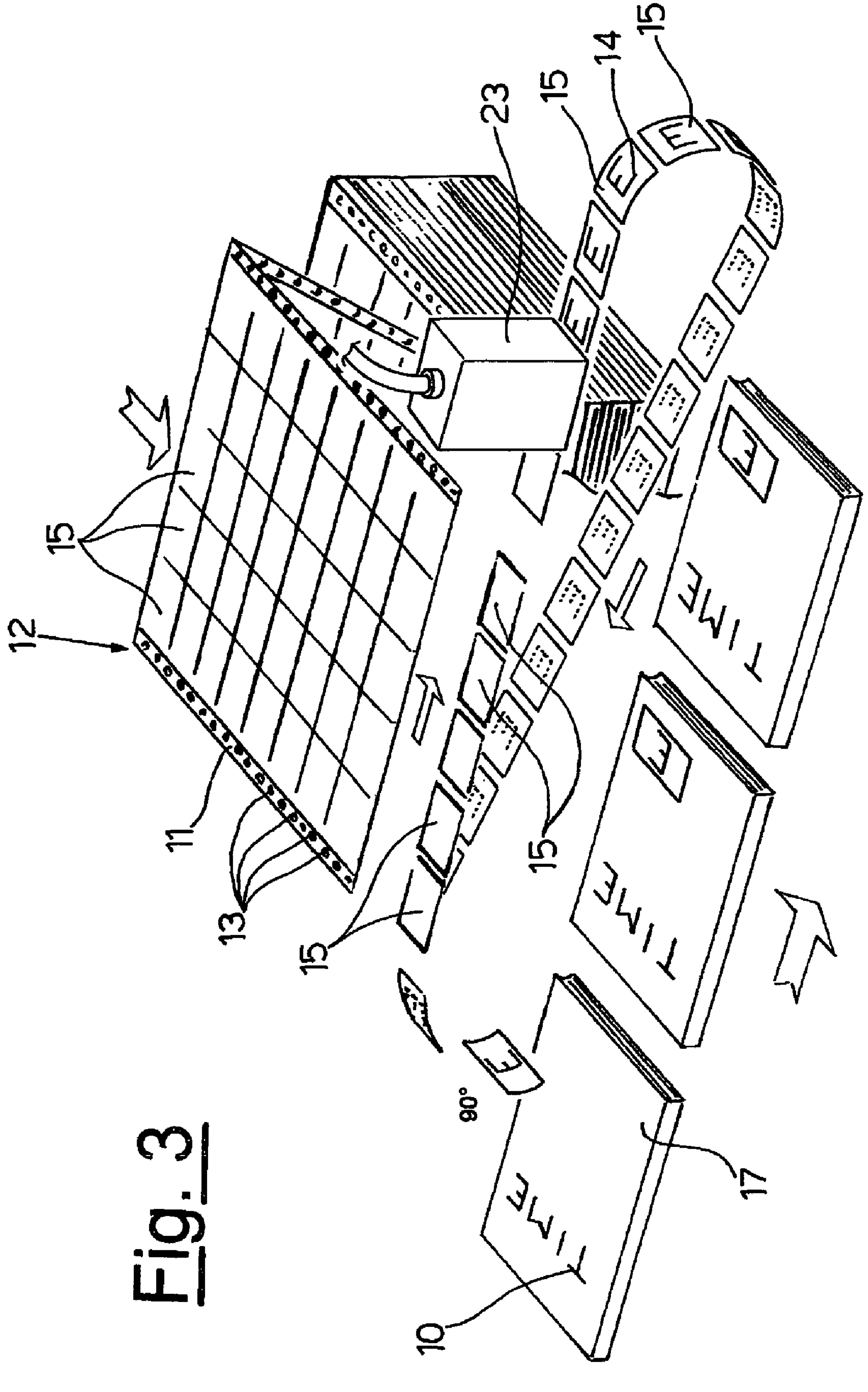
FIG. 3 is a perspective view which summarises the manipulation and printing method of the labels fed from a label sheet according to the present invention, so that that the labels are arranged parallel to the heading title of the product.
Figure 4:
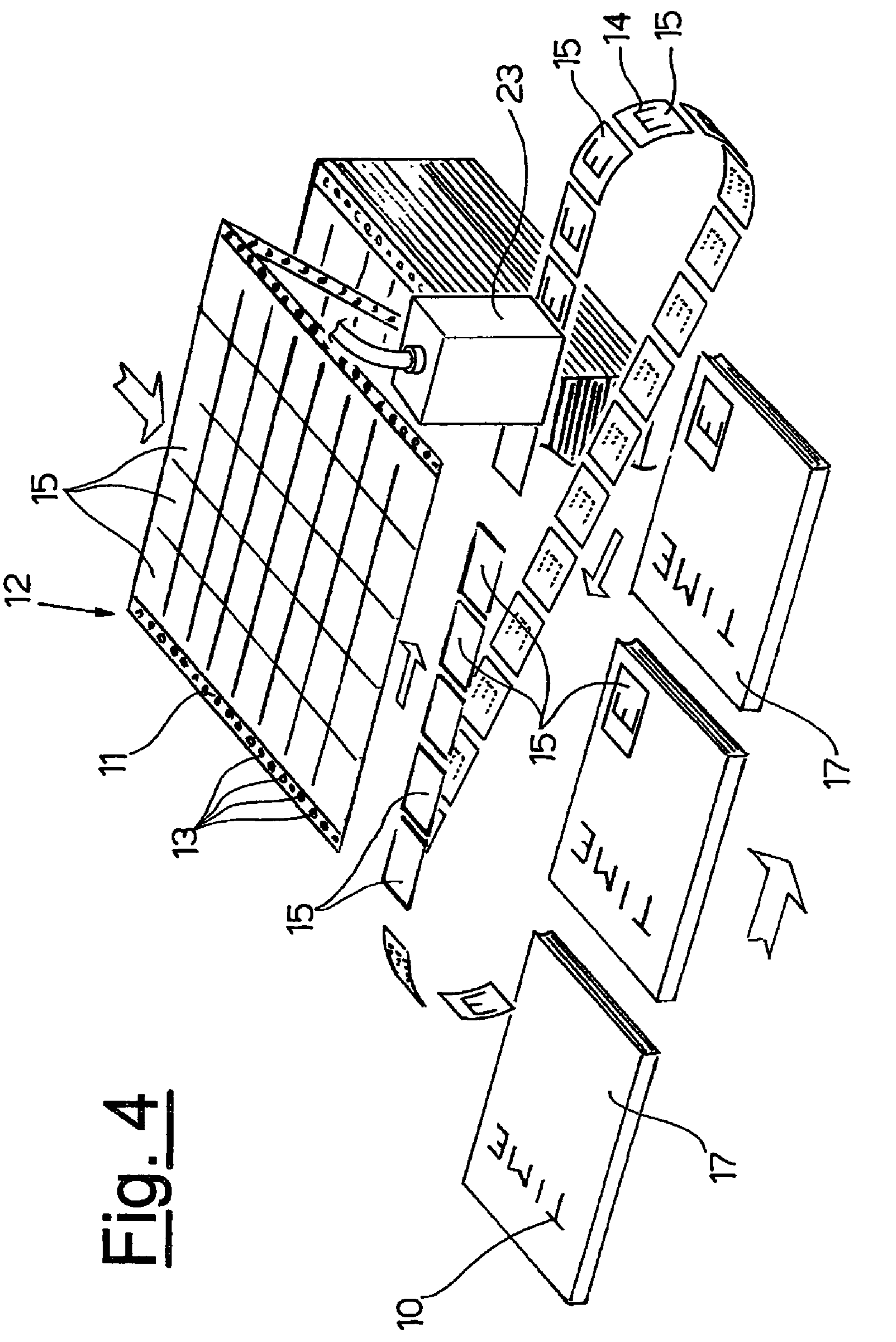
FIG. 4 is a perspective view which summarises the manipulation and printing method of the labels fed from label sheet according to the present invention, so that that they are arranged perpendicular to the heading title of the product.
Figure 5:
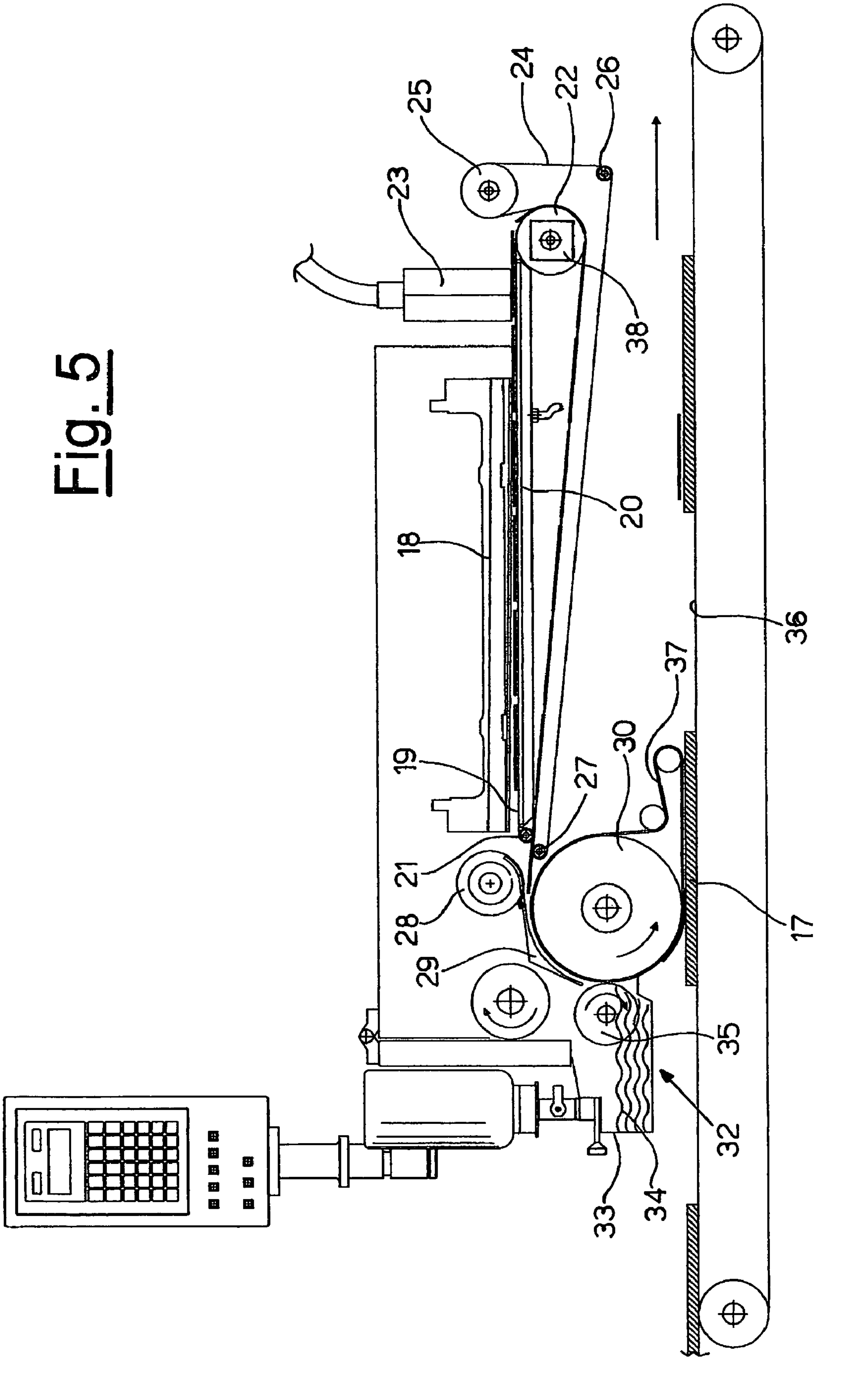
FIG. 5 shows an elevation view, where only the principal details are shown of a manipulation and printing device for feeding labels from a label sheet according to the present invention.

The characteristics and advantages of a manipulation and printing device and a method for labels fed from label sheets according to the present invention shall become clearer from the following description, given as an example and not for limiting purposes, referring to the attached schematic drawings, in which:

FIGS. 1 and 2 are perspective views which summarise the manipulation and printing method of the labels fed from label sheet according to the known art, so that they are arranged both perpendicular and parallel to the heading title of the product;

FIGS. 3 and 4 are perspective views which summarise the manipulation and printing method of the labels fed from label sheet according to the present invention, so that that they are arranged both perpendicular and parallel to the heading title of the product;

FIG. 5 shows a substantially elevation view, where only the principal details are shown of a manipulation and printing device of the labels fed from label sheet according to the present invention.

With reference to the FIGS. 3 to 5 of the drawings, there is shown, in an entirely schematic form, the manner in which the actuation of the method of the present invention occurs, in a manipulation and printing device of labels fed from a label sheet, this also according to the present invention.

Where it presents elements equivalent to those to the known art, the same reference numbers are used for simplification and greater clarity purposes, thus to immediately reveal the differences and considerable advantages with the new and inventive proposed solution.

In the schematic illustrated example, labels 15 are arranged on a continuous sheet 12, such as a label sheet equipped with opposing side edges 11 equipped with drive holes 13. Such label sheet or continuous sheet 12 is whole and folded back as an accordion or in zigzag form on itself into various faces. In this case, according to the present invention, the continuous sheet 12 bears the labels 15 entirely lacking printed portions.

As may be seen in FIG. 5, a transverse cutting group and a series of longitudinal knives are also present, indicated in their entirety with 18, which intervene to separate the single labels 15 from the feeding label sheet 12. Furthermore, the labels 15 thus cut are deposited on a feed belt 19 of such type by means of a suction chamber 20, equipped with superficial holes and situated below the cutting group 18 and perpendicular to the feed direction of the label sheet 12. Such feed belt 19, arranged as a closed circuit between the end rollers 21 and 22, receives the single labels 15, separated by the cutting group 18, and directs them towards a print head 23, for example of ink jet or similar type, situated near a first side end perpendicular to the feed direction of the label sheet 12.

In such a manner, the single label 15 is equipped with a respective printed or written portion 14 on its upper part and is individually advanced by the feed belt 19. Associated to such first feed belt 19 is a second feed belt 24, it too set in a closed circuit and driven on rollers 25, 26 and 27 thus so it faces in a portion of its course the first feed belt 19 and encloses between the two the labels 15 equipped with printed portions 14. In this manner the labels 15 are brought to the side end of the feed direction of the label sheet 12.

There brought, the single labels 15 are sent by one or more feeding rollers 28 and a deflector element 29 to an actual labeller. Such labeller comprises a wheel 30 to receive the single label 15 which is fed from that described above and deposited on a product 17, arranged according to that pre-established. In other words, or as shown in FIG. 3 where the labels 15 are arranged in perpendicular position with respect to a heading title 10 of the product 17 (FIG. 3), or parallel to the heading title 10 through a 90° rotation of the label 15 realised in a step, schematised by the arrow 31, before its deposition on the product 17 (FIG. 4). In particular, it is revealed that facing the terminal end of the feed belts 19 and 24 there may be placed a gluing group 32. Such gluing group 32 foresees a container 33 of glue 34 and a drawing roller 35 which draws the glue 34 from the container 33 and places it on the respective face of the label 15. Such face equipped with glue of the label 15 is then brought by the roller 30 of the labeller on the product 17 in the pre-selected position, while the product 17 is made to advance on a conveyor 36.

Associated to the wheel 30 of the labeller is a group of belts 37 which assist with the placement of the label 15 on the underlying product 17 brought by the conveyor 36.

The device and the method according to the present invention therefore permit the selection of one label after another with entirely personalised printed portions 14 once the label 15 has already been separated from the label sheet 12.

The use of a print head 23 of ink jet or similar type also permits proceeding at the desired speed, also at low speed with a low-cost printing group.

It should moreover be observed that a device and a method according to the present invention also advantageously permit the actuation of a labelling of known type with already printed label sheet.

Indeed, it is sufficient to feed an already printed label sheet by making the upper feed belt 19 rotate in the opposite direction through the activation of a respective reversing motor 38, such that the single label 15 separated by the cutting group 18 is directed towards one or more feeding rollers 28 and the deflector element 29 on the wheel 30 of the actual labeller. Then, afterward, the gluing is realised as indicated or with another similar or equivalent system.

Thus all of the problems connected with the feeding of an already printed label sheet are resolved, for great numbers of use, or for a limited number of labels to be applied, after having printed them in line with the application.

All of this occurs without a high additional cost and with a device of extremely simple and functional parts. A device has even been advantageously realised which permits a variety of placements and feedings of the label, in relation to the need of the local postal service or of the user, acting on the simple variation of the label sheet being fed.

According to the invention, moreover, there is always the possibility of printing lengthwise (FIGS. 3 and 4) and following the printing either positioning the label lengthwise (FIG. 3) or rotating the label so to deposit it crosswise (FIG. 4).

In addition, it is possible to immediately reveal printing errors in labels arranged on products and actuate an immediate recovery of the same. The possibility of an immediate printing according to the corrected diction or version by means of the print head 23 permits reintroducing an additional label on products which thus are immediately modified in the correct manner. It is evident that such operation would be impossible the case of labels already printed obtained from a label sheet, as in the known art.

Moreover, it must not be overlooked that if the labelled product in a subsequent step undergoes damage, it is possible to bring the product back in line and print on the same product a new exact address or label, thanks to the possibility of easy management and versatility of the print head 23 of ink jet or similar type.

Thus the advantages of the present invention are evident with respect to the known art.

The invention claimed is:

1. Manipulation and/or printing method for printed or unprinted labels fed from a continuous label sheet (12) which are cut into rows having uncut single labels (15) which are fed to a cutting group (18) where said single labels (15) are individually cut and placed above a suction feed belt (19) having a first side end and a second side end, said suction feed belt (19) being placed perpendicular to a feed direction of said continuous label sheet (12), said method having a step of feeding said single labels (l5), which are unprinted, on said suction feed belt (19) towards a print head (23), placed at the first side end of said suction feed belt (19) with said print head (23) being placed perpendicular to the feed direction of the label sheet (12), and printing one single label after the other and directing said single labels (15) having writing (14) toward said labeller (30) or if said continuous label sheet (12) is printed, feeding said continuous label sheet (12) to cutting group (18) after first deactivating said print head (23), prior to cutting single labels (15) and thereafter activating said suction feed belt (19) in a direction of rotation directly towards said labeler (30) which is placed near a second side end of said suction feed belt, said labeler (30) being positioned perpendicular to the feed direction of the continuous label sheet (12).

2. Method according to claim 1, characterized in that the activating of said suction feed belt (19) in a direction of rotation directly towards said labeller (30) is by the use of a reversing motor (38).

* * * * *